United States Patent [19]

Abbe et al.

[11] Patent Number: 4,684,472

[45] Date of Patent: Aug. 4, 1987

[54] PRECIPITATION OF WASTE CHROMIUM COMPOUNDS UTILIZING AN AQUEOUS SULFIDE SOLUTION

[75] Inventors: Bruce W. Abbe; Jack M. Cole, both of Borger, Tex.

[73] Assignee: Phillips Petroleum Company, Bartlesville, Okla.

[21] Appl. No.: 819,082

[22] Filed: Dec. 26, 1985

[51] Int. Cl.$^4$ ................................................ C02F 1/52
[52] U.S. Cl. ..................................... 210/720; 210/724; 210/913; 210/919; 423/57
[58] Field of Search ............... 210/702, 720, 724, 913, 210/919; 423/55, 57, 571

[56] References Cited

U.S. PATENT DOCUMENTS

| | | | |
|---|---|---|---|
| 2,679,537 | 5/1954 | Knowlton | 210/919 |
| 3,810,542 | 5/1974 | Gloster et al. | 210/720 |
| 3,901,805 | 8/1975 | Stewart | 210/720 |
| 3,981,965 | 9/1976 | Gancy et al. | 210/913 |

Primary Examiner—Peter Hruskoci
Assistant Examiner—Jeffrey W. Peterson
Attorney, Agent, or Firm—Allen W. Richmond

[57] ABSTRACT

In accordance with the present invention, the chromium content of an aqueous waste containing significant amounts of at least one soluble chromium compound, such as blowdown waters from cooling towers utilizing chromium-containing materials as corrosion inhibitors is reduced, by contacting the chromium-containing waste water with an aqueous waste containing sodium sulfides, particularly spent caustic utilized in a desulfurization of petroleum fractions, to precipitate a substantial amount of the chromium and, thereafter, separating the precipitated chromium from the mixture as a sludge, to produce a waste water which can be safely disposed of to the earth's surface in a sewer or the like.

6 Claims, No Drawings

PRECIPITATION OF WASTE CHROMIUM COMPOUNDS UTILIZING AN AQUEOUS SULFIDE SOLUTION

The present invention relates to the treatment of refinery waste waters. A more specific aspect of the present invention relates to a method of treating one refinery waste water with a second refinery water in order to remove at least one pollutant from at least one of the waste waters.

BACKGROUND OF THE INVENTION

In the refining of petroleum oils, numerous processes and treatments utilize water or aqueous solutions of chemicals which in turn produce numerous waste waters which must be disposed of. However, such waste waters often contain toxic pollutants which create health hazards if discharged to the surface of the earth and sewers, streams or other bodies of water. As a result, the U.S. Environmental Protection Agency (EPA) has identified a large number of such toxic pollutants and set maximum limits which a waste water may contain in order to be safely discharged to the surface and sewers, streams or other bodies of water. A partially troublesome material in this category is chromium. In order to control the discharge of chromium pollutants in waste waters, the EPA has set limits, in a neighborhood of 0.25 mg/l of total chromium and 0.005 mg/l of hexavalent chromium, which may be present in discharged waste waters. These limits create disposal problems in many industries but are particularly troublesome in petroleum refining operations. Chromium compounds are utilized in a variety of refinery treatments such as chromium-containing catalysts for various catalytic processes, such as chromic chloride for the polymerization of olefins, chromic oxide for organic synthesis, etc. To the extent that the products of such catalytic processes are treated with an aqueous solution or water, for purposes of purifying the product, an aqueous waste solution will be produced which often contains chromium in a water-soluble form. The most frequent occurrence of contaminating chromium in refinery waste waters results from the utilization of chromium containing materials as corrosion inhibitors in boiler feed waters, cooling tower waters and the like. As steam is produced in a boiler or water evaporates in a cooling tower, solid salts tend to become concentrated in the water, thereby requiring that a portion of the water be intervally or continuously removed. Chromium from the corrosion inhibitors also builds up in this "blowdown" water. The present invention is particularly applicable to such blowdown waters from the numerous cooling towers utilized in refinery operations. These cooling tower blowdown streams contain soluble chromium compounds significantly in excess of EPA standards and accordingly, the water cannot be simply discharged to the surface and a sewer, stream or other body of water. The several alternatives available are, in some fashion, to remove substantially all of the of the chromium at the plant site, transport the waste waters to a commercial treating facility or utilize less expensive nonchromium-containing corrosion inhibitors or more expensive chromium-containing corrosion inhibitors. In any event, all of these alternatives have heretofore added substantially to the expense of disposing of the waste water.

It is also known, in the petroleum refining art, that most petroleum oils and natural gases contain varying amounts of sulfur in the form of hydrogen sulfide, mercaptans and the like. Accordingly, it is necessary to remove the sulfur from crude oil fractions or products of various refining operations in order to produce the final refinery products for sale, since sulfur results in the formation of corrosive materials as well as air pollutants such as $SO_x$ pollutants. This problem has been exaggerated by the necessity of refining less desirable oils containing higher concentrations of sulfur. One inexpensive technique for removing hydrogen sulfide and lower molecule weight mercaptans from petroleum streams is the caustic washing of the stream. During such caustic washing the sulphur will generally be removed as sodium hydrosulfide or sodium sulfide, both of which are soluble in water. As a result, substantial volumes of used or "spent" caustic solutions are produced as aqueous wastes which also must be disposed of in some manner. In plant treatment to recover the caustic treating agent and/or sulfur and transportation to commercial waste water processors will generally not be economically feasible. As a result, a common practice in the art is to send these solutions to evaporation ponds. However, this solution obviously requires a great deal of pond space and there is always the possibilty that contaminants from the pond may seep into ground waters.

It would therefore be highly desirable, in refinery operations, to be able to effectively and economically treat waste waters to remove hazardous or undesirable components therefrom, particularly if one waste water could be utilized to treat another waste water.

SUMMARY OF THE INVENTION

It is therefore an object of the present invention to provide an improved method for treating refinery waste waters which overcomes the above and other disadvantages of prior art. Another object of the present invention is to provide an improved method of treating refinery waste waters to remove hazardous and/or undesirable components therefrom. Yet another object of the present invention is to provide an improved process for the treatment of refinery waste waters in which a first waste water is treated with a second waste water in order to remove hazardous and/or undesirable components from at least one of said waste waters. A further object of the present invention is to provide an improved method for reducing the chromium content of an aqueous waste containing significant amounts of at least one soluble chromium compound. A still further object of the present invention is to provide an improved method for reducing the chromium content of an aqueous waste containing significant amounts of at least one soluble chromium compound in which an aqueous waste containing sodium sulfides is utilized to treat the chromium-containing waste water. Yet another object of the present invention is to provide an improved method for reducing the chromium content of an aqueous waste containing significant amounts of at least one soluble chromium compound in which the chromium-containing waste is treated with a spent caustic solution which has been utilized in a caustic washing of petroleum derivatives to remove sulfur therefrom. Another and further object of the present invention is to provide an improved method for reducing the chromium content of cooling tower blowdown waters, in which the chromium is present as a result of the use of chromium-containing substances as corrosion inhibitors, wherein the chromium-containing waste water is treated with a spent caustic solution, which has been utilized in a caustic washing of petroleum derivatives, to remove sulfur therefrom. These and other objects of the present invention will be apparent from the following description.

DESCRIPTION OF THE INVENTION

In accordance with the present invention, an aqueous waste containing significant amounts of at least one soluble chromium compound is treated, to reduce the chromium content thereof, by contacting the chromium-containing waste water with an aqueous waste containing sodium sulfides, selected from the group consisting of sodium sulfide, sodium disulfide and mixtures thereof, in an amount sufficient to convert a substantial amount of the soluble chromium to a solid precipitate containing chromium, settling or otherwise separating the aqueous mixture to form a sludge fraction and an aqueous fraction which can be safely disposed of. In a preferred embodiment, the aqueous waste containing significant amounts of soluble chromium is a blowdown water from cooling towers and the aqueous waste containing sodium sulfides is a spent caustic solution which has been utilized for the removal of sulfur from petroleum steams.

DESCRIPTION OF THE PREFERRED EMBODIMENTS

While the following description is confined to the use of specific aqueous wastes containing sodium sulfides to reduce the chromium content of specific wastes containing soluble chromium compounds, it is to be understood that other aqueous waste streams can be used in the treatment of other aqueous waste streams of like character and particularly other aqueous waste streams produced in the refining of petroleum oils and the treatment of natural gases.

As pointed out in the introductory portion hereof, a variety of aqueous wastes containing significant amounts of at least one soluble chromium compound are produced in a petroleum refinery. These aqueous wastes contain amounts of chromium significantly in excess of the total chromium content of 0.25 mg/l and/or in excess of 0.005 mg/l of hexavalent chromium set by the EPA. A particular source of such chromium-containing waste is the blowdown water from atmospheric cooling towers utilized throughout the refinery. The chromium content of these blowdown waters arises from the utilization of chromium-containing corrosion inhibitors in a cooling water, particularly sodium dichromate. These blowdown waters exhibit a yellow or yellow-orange color and, accordingly, it is believed that the soluble chromium is present in the form of sodium chromate or sodium dichromate.

As is also pointed out in the introductory portion hereof, numerous refinery streams are treated with aqueous caustic (NaOH) in order to remove sulfur components therefrom, particularly hydrogen sulfide and lower molecular weight mercaptans. As a result of this treatment, substantial volumes of spent caustic are produced which contain, among other materials, sodium sulfide and sodium hydrosulfide. One such stream of particular interest in accordance with the present invention, is a spent caustic resulting from the treatment of olefinic hydrocarbon streams. Such olefinic hydrocarbon streams are produced as a product of the catalytic cracking of various petroleum fractions and, after purification, are utilized in alkylation processes involving the reaction of olefinic hydrocarbons with isoparaffinic hydrocarbons to produce high octane gasoline blending stocks. These olefinic hydrocarbon streams often contain in excess of about 500 ppm of hydrogen sulfide and, accordingly, are caustic washed to remove the hydrogen sulfide.

In accordance with the present invention, it has been found that an aqueous waste containing significant amounts of soluble chromium compounds, in amounts significantly above EPA standards, particularly cooling tower blowdown waters, can be treated to reduce the chromium content thereof to a level below the EPA limit by contacting the chromium-containing waste water with an aqueous waste containing sodium sulfides, particularly sodium sulfide, sodium disulfide or mixtures thereof. The preferred aqueous waste containing sodium sulfides is a spent caustic resulting from the removal of sulfur compounds, particularly, hydrogen sulfide and lower molecular weight mercaptans, from petroleum streams such as spent caustic produced in the removal of sulfur components from an olefinic hydrocarbon product of a catalytic cracking operation by aqueous caustic washing. While the original form of the soluble chromium in the aqueous waste containing chromium is not known, as previously pointed out, the chromium-containing waste water is generally a yellow or yellow-orange color and, consequently, it is believed that the chromium is in the form of sodium chromate or sodium dichromate, both of which are soluble in water. While it is generally known that the sulfur removed by caustic washing is present in the spent caustic primarily in the form of sodium sulfide or sodium hydrosulfide, it is not known what chemical reaction takes place between the sodium sulfide and/or sodium hydrosulfide and the soluble chromium compounds nor the character of the final chromium compounds. However, it has been found that the chromium compounds are converted to a solid precipitate. The resultant aqueous mixture containing this precipitate has been observed to be green in color. Accordingly, it is speculated that the chromium is present as water insoluble chromic sulfate, chromoxide and/or chromic hydroxide.

In a specific utilization of the method in a petroleum refinery about 25 to 50 gallons per hour of spent caustic are utilized to treat 60,000 gallons per hour of cooling tower blowdown waters from 10 refinery cooling towers. However, it has been found that 5 to 10 gallons per hour of spent caustic is effective in treating this volume of cooling tower blowdown water. The additional spent caustic utilized in actual operations reduces the volume of spent caustic which must be otherwise treated or disposed of, as by transmission to a settling pond.

The mixture of spent caustic and chromium-containing waste water, containing the thus precipitated chromium, is thereafter treated, to separate a sludge fraction from an aqueous fraction, in a waste water treating plant or by a simple settling procedure, for a time sufficient to settle out the precipitate in the form of a sludge and removing the sluge from the aqueous fraction. The resultant separated aqueous fraction may thus be safely disposed of to the earth's surface or a sewer or other disposal facility.

While specific materials, conditions of operation, modes of operation and equipment have been referred to herein, it is to be recognized that these and other specific recitals are for illustrative purposes and to set for the best mold only and are not to be considered limiting.

That which is claimed is:

1. A method for reducing the chromium content of an aqueous waste containing significant amounts of at least one soluble chromium compound derived from water treated with a chromium-containing material as a corrosion inhibitor, comprising:

(a) contacting said aqueous waste, containing chromium, with an aqueous waste containing sodium sulfides, selected from the group consisting of sodium sulfide, sodium disulfide and mixtures thereof, produced by washing petroleum derivatives with an aqueous caustic solution to desulfurize the same, in an amount and for a time sufficient to convert a substantial amount of said soluble chromium compound to a solid precipitate containing chromium;

(b) settling the aqueous mixture formed in contacting step (a), in a settling pond, for a time sufficient to form a sludge phase containing said solid precipitate containing chromium and an aqueous phase; and (c) separating said sludge phase from said aqueous phase.

2. A method in accordance with claim 1 wherein the water treated with a chromium-containing material is a cooling tower water.

3. A method in accordance with claim 2 wherein the aqueous waste containing chromium is a blowdown portion of the cooling tower water.

4. A method in accordance with claim 1 wherein the petroleum derivatives contain a significant amount of hydrogen sulfide.

5. A method in accordance with claim 1 wherein the petroleum derivatives additionally contain mercaptan compounds.

6. A method in accordance with claim 1 wherein the petroleum derivatives are an olefinic hydrocarbon product of a catalytic cracking operation.

* * * * *